UNITED STATES PATENT OFFICE.

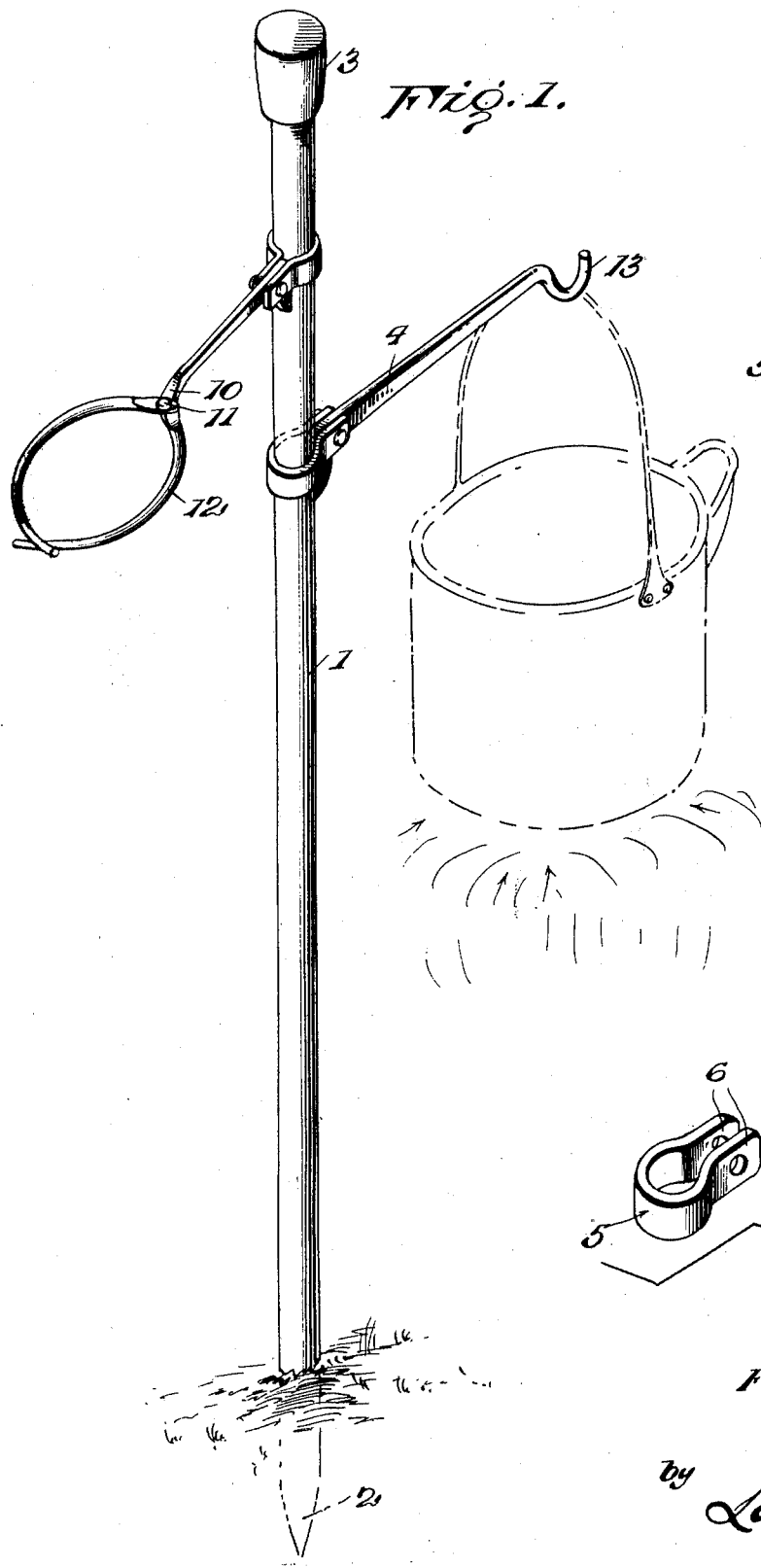

FRANK W. CANTLEBERRY, OF SISQUOC, CALIFORNIA.

DEVICE FOR SUPPORTING COOKING UTENSILS.

1,366,872.   Specification of Letters Patent.   Patented Jan. 25, 1921.

Original application filed October 24, 1918, Serial No. 259,565. Divided and this application filed January 12, 1920. Serial No. 350,812.

*To all whom it may concern:*

Be it known that I, FRANK W. CANTLEBERRY, a citizen of the United States, residing at Sisquoc, in the county of Santa Barbara and State of California, have invented certain new and useful Improvements in Devices for Supporting Cooking Utensils, of which the following is a specification.

This invention relates to devices for supporting cooking vessels and has as its primary object to provide a device especially adapted for camp use in supporting pans, kettles, portable ovens, and, in fact, any and all types of cooking vessels which it may be desired to employ.

A further object of the invention is to provide a device for the purpose stated so constructed that the various vessels may be positioned upon the standard of the device at various elevations so as to be more or less closely positioned with relation to the flames, depending upon the commodity being cooked and the variations in temperature conditions found most desirable in cooking different commodities.

A further object of the invention is to so mount the utensil supporting members upon the standard of the device that these members may be adjusted vertically upon the standard at various elevations while supporting their respective utensils and without requiring the loosening and tightening of set screws or the manipulation of other devices for effecting such adjustment which it would be impracticable to manually grasp or otherwise manipulate because of proximity to the burning fuel.

Another object of the invention is to provide a device for the purpose stated which may be folded or otherwise collapsed to compact form when not in use and when being transported so that under such conditions it will occupy a minimum space and will not be cumbersome.

The present application is a division of my copending application filed October 24, 1918, Serial No. 259,565.

In the accompanying drawings:

Figure 1 is a perspective view of the device;

Fig. 2 is a detail vertical sectional view through the standard and one of the supporting arms of the device;

Fig. 3 is a perspective view illustrating the parts of one of the arms disassembled.

In the drawings the numeral 1 indicates the standard of the device, which standard is preferably in the nature of a cylindrical rod provided with a lower pointed end 2 which may be driven into the ground. In order that blows may be struck upon the upper end of the standard for the purpose of driving its lower end into the ground and without likelihood of battering down or burring the upper end of the standard, the standard is provided with a driving head 3.

I have found it desirable to provide for mounting of the supporting members upon the standard in such manner that the members may be readily adjusted vertically along the standard so as to support the utensils at various elevations, and may also be rotatably adjusted about the standard to position the various utensils more or less directly over the burning fuel or to shift the utensils from one side to another to obtain the most favorable results under varying conditions. Each of the supporting devices comprises an arm indicated in general by the numeral 4 and an open collar which is indicated in general by the numeral 5, the opening of which collar is of a diameter to adapt the collar to slidably fit the standard 1, and at the open side the collar is provided with outstanding spaced ears 6 between which is fitted the inner end of the arm of the supporting member, which end is indicated by the numeral 7. A pivot pin 8 is passed through the arm and through openings in the ears 6 and serves to pivotally connect the arm with the collar, and the said arm inwardly of its pivot is extended downwardly to provide a nose 9 which is designed to bear against the side of the standard 1 and effectually bind against the same when the arm is in substantially horizontal or extended position and the weight of the arm is imposed through the pivot 8 against the said nose.

In one form of the invention the outer end of the arm is flattened as indicated by the numeral 10, and pivotally mounted upon the flattened end of the arm as indicated by the numeral 11, are utensil embracing arms 12 which are curved preferably uniformly from their inner to their outer ends. It will be understood that any vessel provided with a flanged upper edge or outstanding rim may be disposed between the arms 12 in such position that the said arms will engage beneath the rim or flange and inasmuch as the arms are pivoted at their inner ends and therefore relatively movable toward and away from each other, they may be adapted to embrace and support vessels or utensils of various diameters. In another form of the invention the arm 4 is provided at its outer end with a hook 13 upon which may be hung the bail of a utensil.

It will be understood that the greater the weight imposed upon the arms the more firmly the nose 9 will be caused to bear against the standard 1. Also when the nose binds against one side of the standard the collar will be caused to bind against the opposite standard and thus the supporting member as a whole will be effectually held against downward slipping upon the standard. However, the member as a whole may be rotatably swung about the standard as a center, as will be readily understood, and it may be shifted upwardly upon the standard or permitted to lower upon the standard by swinging the arm upwardly and at the same time pulling up upon the collar 5 or upon said arm, or these parts may be permitted to lower through gravity.

Having thus described the invention, what is claimed as new is:

In a device of the class described, a smooth standard, an open collar snugly fitting the standard but movable relative thereto and provided at its open side with spaced ears, an arm pivotally mounted between the ears close to the standard and having a depending nose bearing against the standard and binding against the same and causing the collar to bind against the opposite side of the standard under influence of a load on the arm, and supporting means carried by the arm.

In testimony whereof I affix my signature.

FRANK W. CANTLEBERRY. [L. S.]